United States Patent
Garay et al.

(10) Patent No.: US 11,366,656 B2
(45) Date of Patent: Jun. 21, 2022

(54) IDENTIFYING CUSTOMIZATION CHANGES BETWEEN INSTANCES

(71) Applicant: ServiceNow, Inc., Santa Clara, CA (US)

(72) Inventors: Ivan Garay, Santa Clara, CA (US); Royce Davis, Dallas, TX (US); Clint Sowada, Aurora, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/741,083

(22) Filed: Jan. 13, 2020

(65) Prior Publication Data
US 2020/0225939 A1  Jul. 16, 2020

Related U.S. Application Data

(63) Continuation of application No. 15/698,301, filed on Sep. 7, 2017, now Pat. No. 10,545,755.

(51) Int. Cl.
*G06F 9/44* (2018.01)
*G06F 9/455* (2018.01)
(Continued)

(52) U.S. Cl.
CPC .............. *G06F 8/71* (2013.01); *G06F 8/658* (2018.02); *G06F 16/2358* (2019.01);
(Continued)

(58) Field of Classification Search
CPC ........ G06F 8/71; G06F 8/658; G06F 16/2358; G06F 16/2365; G06F 9/44505; G06Q 10/06
See application file for complete search history.

(56) References Cited

U.S. PATENT DOCUMENTS 6,321,229 B1  11/2001  Goldman
6,678,887 B1   1/2004  Hallman
(Continued)

OTHER PUBLICATIONS

Ibm, IT Security Policy Management Usage Patterns Using IBM Tivoli Security Policy Manager, 2011, pp. 1-314. http://www.redbooks.ibm.com/redbooks/pdfs/sg247880.pdf (Year: 2011).*
(Continued)

*Primary Examiner* — Mongbao Nguyen
(74) *Attorney, Agent, or Firm* — Fletcher Yoder PC

(57) ABSTRACT

A system, method, and non-transitory computer-readable storage medium for identifying customization changes have been disclosed. The system comprises a processor and a memory that includes instructions executable by the processor to cause the system to identify a baseline script of a plurality of baseline scripts from a baseline instance that corresponds to a custom script of a plurality of custom scripts from a customized instance. The customized instance is a customized version of the baseline instance. The instructions are executable to cause the system to compare the baseline script to the custom script to identify one or more changes between the baseline script and the custom script, to determine an amount of change using the one or more identified changes, and to generate a graphical user interface that includes an identifier of the baseline script, an identifier of the custom script, and a graphical indication of the amount of change.

20 Claims, 12 Drawing Sheets

(51) Int. Cl.
*G06F 9/445* (2018.01)
*G06F 8/71* (2018.01)
*G06F 16/23* (2019.01)
*G06F 8/658* (2018.01)
*G06Q 10/06* (2012.01)

(52) U.S. Cl.
CPC ...... *G06F 16/2365* (2019.01); *G06F 9/44505* (2013.01); *G06Q 10/06* (2013.01)

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,925,981 B2 | 4/2011 | Pourheidar |
| 7,933,927 B2 | 4/2011 | Dee |
| 7,945,860 B2 | 5/2011 | Vambenepe |
| 8,082,222 B2 | 12/2011 | Rangarajan |
| 8,151,261 B2 | 4/2012 | Sirota |
| 8,380,645 B2 | 2/2013 | Kowalski |
| 8,402,127 B2 | 3/2013 | Solin |
| 8,495,620 B2 | 7/2013 | Chopra et al. |
| 8,554,750 B2 | 10/2013 | Rangaranjan |
| 8,612,408 B2 | 12/2013 | Trinon |
| 8,646,093 B2 | 2/2014 | Myers |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,950,007 B1 | 2/2015 | Teal et al. |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,176,729 B2 | 11/2015 | Mockus et al. |
| 9,183,123 B2 | 11/2015 | Spektor et al. |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,557,969 B2 | 1/2017 | Sharma |
| 9,606,900 B1 | 3/2017 | Pradhan et al. |
| 9,613,070 B2 | 4/2017 | Kumar |
| 9,626,710 B1 * | 4/2017 | Chheda ............... G06Q 30/0631 |
| 9,641,406 B1 | 5/2017 | Allen |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 10,001,986 B1 | 6/2018 | De Gaetano et al. |
| 10,002,203 B2 | 6/2018 | George |
| 10,067,755 B2 | 9/2018 | Kaminski et al. |
| 10,185,549 B2 | 1/2019 | Simek et al. |
| 10,204,013 B2 | 2/2019 | Scott |
| 10,296,750 B1 * | 5/2019 | Rossman ............... G06F 21/62 |
| 10,558,482 B1 * | 2/2020 | Miller ................. H04L 61/2514 |
| 11,025,707 B1 * | 6/2021 | Luker ................. H04L 43/0811 |
| 2007/0203956 A1 | 8/2007 | Anderson et al. |
| 2009/0064092 A1 | 3/2009 | Roberts et al. |
| 2009/0205012 A1 * | 8/2009 | Jain ....................... G06F 21/577 726/1 |
| 2009/0228512 A1 | 9/2009 | Chopra et al. |
| 2010/0070319 A1 * | 3/2010 | Prafullchandra ...... G06Q 10/06 726/22 |
| 2011/0196853 A1 | 8/2011 | Bigham et al. |
| 2011/0225275 A1 | 9/2011 | Shah et al. |
| 2012/0173998 A1 | 7/2012 | Chaturvedi et al. |
| 2012/0209818 A1 | 8/2012 | Richter et al. |
| 2013/0081101 A1 * | 3/2013 | Baer ....................... H04L 63/20 726/1 |
| 2013/0209818 A1 | 8/2013 | Fairclough et al. |
| 2013/0247196 A1 * | 9/2013 | Brando ..................... G06F 8/61 726/23 |
| 2014/0040314 A1 * | 2/2014 | Ebrahimi ................ G06F 16/25 707/783 |
| 2014/0380404 A1 * | 12/2014 | Raj ..................... G06F 21/6218 726/1 |
| 2015/0074645 A1 | 3/2015 | Herrin et al. |
| 2015/0095892 A1 | 4/2015 | Baggott et al. |
| 2015/0100940 A1 | 4/2015 | Mockus et al. |
| 2015/0220426 A1 | 8/2015 | Spektor et al. |
| 2015/0249681 A1 * | 9/2015 | Zhang .................. G06F 40/205 726/1 |
| 2016/0103675 A1 * | 4/2016 | Aabye ....................... G06F 8/65 717/170 |
| 2016/0132314 A1 | 5/2016 | Solsona-Palomar |
| 2016/0132317 A1 * | 5/2016 | Mitchell ................... G06F 8/60 717/170 |
| 2016/0162286 A1 * | 6/2016 | Bankole .................... G06F 8/65 717/170 |
| 2016/0274907 A1 | 9/2016 | Narayanan et al. |
| 2017/0041206 A1 * | 2/2017 | Maes .................. H04L 41/5009 |
| 2017/0052776 A1 * | 2/2017 | Kotian .................... H04L 67/34 |
| 2017/0116013 A1 * | 4/2017 | Chen ....................... G06F 11/14 |
| 2017/0171034 A1 | 6/2017 | Lucas et al. |
| 2017/0177324 A1 | 6/2017 | Frank et al. |
| 2017/0177682 A1 * | 6/2017 | Lingamneni ............ H04L 67/10 |
| 2017/0180266 A1 | 6/2017 | Frank et al. |
| 2017/0180346 A1 * | 6/2017 | Suarez ..................... G06F 21/53 |
| 2017/0206080 A1 | 7/2017 | Leupold et al. |
| 2017/0220330 A1 * | 8/2017 | Soini ..................... H04L 63/166 |
| 2017/0228229 A1 * | 8/2017 | Jain ....................... G06F 3/04817 |
| 2017/0293887 A1 * | 10/2017 | Rathbun ................ G06Q 10/10 |
| 2017/0322795 A1 * | 11/2017 | DeMaris ................... G06F 8/65 |
| 2017/0330197 A1 * | 11/2017 | DiMaggio .......... G06Q 10/0635 |
| 2017/0371639 A1 | 12/2017 | Simek et al. |
| 2018/0034856 A1 * | 2/2018 | Mallya .................... H04L 63/10 |
| 2018/0067845 A1 | 3/2018 | Costello, Jr. et al. |
| 2018/0107479 A1 | 4/2018 | Duppenthaler et al. |
| 2018/0121322 A1 | 5/2018 | Reyes |
| 2018/0165264 A1 | 6/2018 | Venkataraman et al. |
| 2018/0211045 A1 | 7/2018 | Abukhovsky et al. |
| 2018/0349257 A1 * | 12/2018 | Bhattacharjee ........... G06F 8/71 |
| 2019/0026320 A1 | 1/2019 | Sharma et al. |
| 2019/0050576 A1 * | 2/2019 | Boulton ................. G06F 21/577 |
| 2019/0061971 A1 | 2/2019 | Kim et al. |
| 2020/0099773 A1 * | 3/2020 | Myers ................. H04L 67/1095 |
| 2020/0193058 A1 * | 6/2020 | Vaidhyanathan ... G06F 16/1734 |

OTHER PUBLICATIONS

Chelsea Komlo, Incorporating Security Best Practices into Agile Teams, 2016, pp. 1-13. https://www.thoughtworks.com/insights/blog/incorporating-security-best-practices-agile-teams (Year: 2016).*

Myles Hosford, How to Audit Your AWS Resources for Security Compliance by Using Custom AWS Config Rules, 2017, pp. 1-13. https://aws.amazon.com/blogs/security/how-to-audit-your-aws-resources-for-security-compliance-by-using-custom-aws-config-rules/ (Year: 2017).*

Microsoft, Developer Network, Dynamics NAV, "How Do I: Compare Microsoft Dynamics NAV Application Objects Using Application Merge Utilities in Microsoft Dynamics NAV 2015", https://msdn.microsoft.com/en-us/dynamics/nav/tln904571.aspx, Downloaded Aug. 30, 2017, 2 pp.

(56) References Cited

OTHER PUBLICATIONS

Synology, Knowledge Base, "DiskStation Manager", https://www.synology.com/en-us/knowledgebase/DSM/tutorial, Downloaded Aug. 30, 2017, 3 pp.
SAP, "Tools to Compare SAP SPRO Configuration between 2 instances", Raveendra Reddy, Jun. 20, 2009, https://~rchive.sap.com/discussions/message/7725688#7725688, Downloaded Aug. 30, 2017, 3 pp.
Netsparker, Web Security Readings, "An Automated Scanner That Finds All OWASP Top 10 Security Flaws, Really?", https://www.netsparker.com/blog/web-security/owasp-top-10-web-security-scanner/, Downloaded Aug. 30, 2017, 6 pp.
Sparx systems, Version Control Best Practices for Enterprise Architect, 2010, pp. 1-17 https://sparxsystems.com.au/White PapersNersion_ Control.pdf (Year: 2010).
Servicenow, Governance Technical Best Practices, pp. 1-17, 2016 https://www.caskllc.com/wp-content/uploads/2016/03/Governance_ Tech_Best_Practices-1.pdf (Year: 2016).
N. Nagaratnam, Business-driven application security: From modeling to managing secure applications, 2005, pp. 847-866. https://ieeexplore.IEEE.org/stamp/stamp.jsp?tp=&arnumber=5386703 (Year: 2005).
Matthew A. McCarthy, A Compliance Aware Software Defined Infrastructure, 2014, pp. 560-566. https://ieeexplore.ieee.org/stamp/stamp.jsp?tp=&arnumber=6930580 (Year: 2014).
ChelseaKomlo, Incorporating Security Best Practices into Agile Teams, 2016, pp. 1-16. https://www.thoughtworks.com/insights/blog/incorporating-security-best-practices-agile-teams (Year: 2016).
Amazon, AWS Security Best Practices, 2016, pp. 1-73. https://d1.awsstatic.com/whitepapers/aws-security-best-practices.pdf (Year: 2016).

\* cited by examiner

IDENTIFYING CUSTOMIZATION CHANGES BETWEEN INSTANCES

CROSS-REFERENCE TO RELATED APPLICATION

This Application is a continuation of U.S. patent application Ser. No. 15/698,301, filed Sep. 7, 2017, which is herein incorporated by reference.

TECHNICAL FIELD

This disclosure relates to identifying customization changes between instances.

BACKGROUND

Instances of software in a single-tenant or multi-instance environment can operate on behalf of different tenants or customers. During the normal course of operation, these customer instances can be customized with custom scripts.

SUMMARY

Disclosed herein are implementations of systems, methods, and techniques for identifying customization changes between instances.

In an implementation, a system is provided for identifying customization changes. The system comprises a processor and a memory coupled to the processor. The memory includes instructions executable by the processor to cause the system to identify a baseline script of a plurality of baseline scripts from a baseline instance that corresponds to a custom script of a plurality of custom scripts from a customized instance, wherein the customized instance is a customized version of the baseline instance. The memory further includes instructions executable by the processor to cause the system to compare the baseline script to the custom script to identify one or more changes between the baseline script and the custom script, to determine an amount of change using the one or more identified changes, and to generate a graphical user interface that includes an identifier of the baseline script, an identifier of the custom script, and a graphical indication of the amount of change.

In an implementation, a method is provided for identifying customization changes. The method includes identifying a baseline script of a plurality of baseline scripts from a baseline instance that corresponds to a custom script of a plurality of custom scripts from a customized instance, wherein the customized instance is a customized version of the baseline instance. The method further includes comparing the baseline script to the custom script to identify one or more changes between the baseline script and the custom script, determining an amount of change using the one or more identified changes, and generating a graphical user interface that includes an identifier of the baseline script, an identifier of the custom script, and a graphical indication of the amount of change.

In an implementation, a non-transitory computer-readable storage medium is provided for identifying customization changes. The non-transitory computer-readable storage medium includes executable instructions that, when executed by a processor, facilitate performance of operations. The operations include identifying a baseline script of a plurality of baseline scripts from a baseline instance that corresponds to a custom script of a plurality of custom scripts from a customized instance, wherein the customized instance is a customized version of the baseline instance. The operations further include comparing the baseline script to the custom script to identify one or more changes between the baseline script and the custom script, determining an amount of change using the one or more identified changes, and generating a graphical user interface that includes an identifier of the baseline script, an identifier of the custom script, and a graphical indication of the amount of change.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 9 is a screen shot illustrating an example of a system for comparing baseline scripts of a baseline instance and custom scripts of a customized instance in accordance with implementations of this disclosure.

FIG. 10 is a screen shot illustrating a dashboard of an example of a system for auditing against security best practices in accordance with implementations of this disclosure.

DETAILED DESCRIPTION

Figure 1:
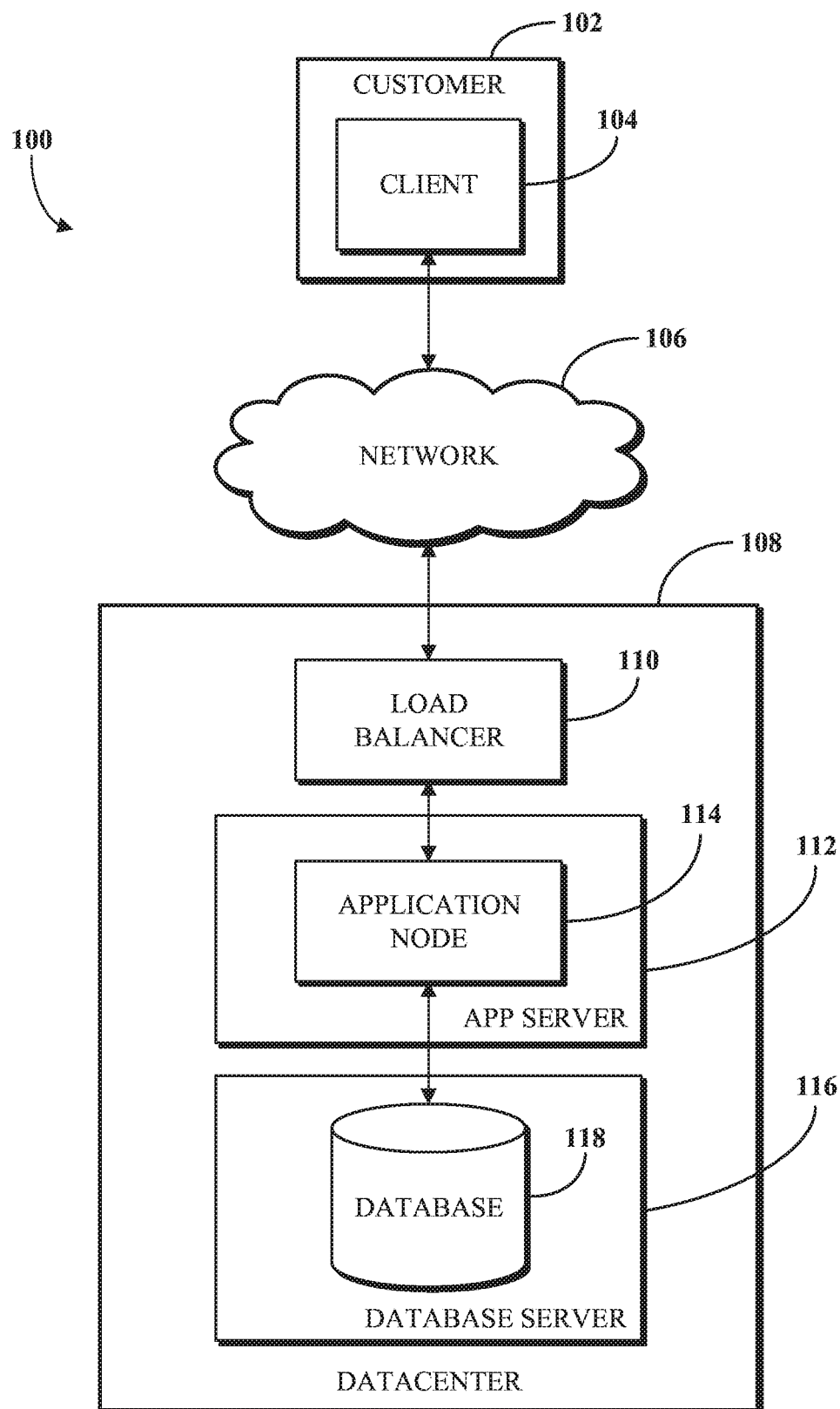
FIG. 1 is a block diagram illustrating an example of an electronic computing and communications system.

Customers of a computing (e.g., Platform-as-a-Service (PaaS)) provider can use or develop applications that operate on or using configurable platform software. An instance of the platform software can be implemented using one or more application nodes and database nodes, such as described later with respect to FIG. 1. The instance can be customized by the customer (i.e., code and/or scripts can be amended, added, removed, etc.) which can lead to incidents or issues that need to be resolved. Customizations can be added to a customer's instance either by the customer themselves or by a third-party administrator that customizes the customer's instance. The third-party administrator may only manage the customer's instance for a predetermined time period as specified in a contract and when the third-party administrator's contract expires, the customer may not have access to information concerning which aspects of the instance has been customized. In addition, numerous personnel associated with the customer may have access to a customer instance and so tracking each of their access and customization efforts can be difficult.

The resolution of incidents via an incident management system can be carried out by technical service engineers (TSEs) or other customer support personnel. Although policy agreements between the customers and the computing provider typically specify that issues related to customizations are not to be handled by TSEs, TSEs typically spend a portion of their time handling and working on issues related to customizations. This affects the ability for customer support personnel to handle growing incident counts which typically leads to the hiring of additional personnel which is not scalable. As incident counts grow, the customer support engine's backlog grows with time consuming and costly customization related incidents that can be handled by the customers themselves. This also results in a decreased customer support experience for the customer as well.

Implementations of the present disclosure provide a system (e.g., a baseline application) and a method for identifying customization changes associated with an instance or a plurality of instances. The system and method provides more effective and more efficient techniques that enable the customers to identify customizations to their instance(s) and to reduce their customization related issues while requiring less help from the customer support personnel. The present disclosure provides a baseline application that allows customers to interactively work together on their customer instance while keeping track of the customizations which empowers the customers by quickly showing them the customizations that have been made. The baseline application can analyze custom scripts that are associated with the customer's instance using tables that the original scripts (i.e., baseline scripts) are associated with and can also identify newly added scripts that are not associated with any baseline scripts. The baseline application can analyze scripts between at least two instances such as a baseline instance and a customized instance (which is a customized version of the baseline instance).

In addition, many issues or incidents may be caused by security flaws in the customer's instance. The security flaws can result from a failure to implement or integrate certain security best practices that are recommended or provided by the service provider. The security best practices can be provided via custom scripts that must be added to the customer's instance or via instructions for the customer to add various custom scripts or newly added scripts. The system and method provided by the present disclosure also enable audits and comparisons to be done between customer instances and instances that have implemented all security best practices. The comparison can uncover and identify security flaws and gaps and can provide recommendations to the customer regarding how to address such security flaws/gaps.

Custom scripts can refer to customizations of the baseline scripts where the baseline script serves as the original script that is customized resulting in the custom script. Custom scripts can also refer to customizations of other custom scripts or newly added scripts. The previous custom scripts or newly added scripts serve as the original script that is customized resulting in the additional custom script. The custom scripts can have altered code, added code, deleted code, and other variations with respect to the associated baseline scripts. The customizations can be a variety of customization types including code customizations (e.g., altered/added/deleted code and other aspects related to the instance including but not limited to assessments, tables, access controls (ACLs), user interface (UI) pages, public pages, glide properties, processors, scripts), upgrade customizations (e.g., customization changes added after an instance version has been upgraded), expected customizations, and unknown customizations.

In some implementations, at least two instances that the customer or client has access to are utilized to identify the customization changes. The customer can specify which instance should serve as the baseline instance and which instance or plurality of instances should serve as the customized instance(s). The baseline instance can refer to a variety of different instances including but not limited to an original baseline instance provided to the customer by a service provider (e.g., a PaaS provider) that has not been altered in any fashion and that is being compared to a another instance (e.g., a customized instance that is a customized version of the baseline instance), to a first customized instance that is being compared to another customized instance (e.g., a customized version of the first customized instance or a customized version of a different customized instance), to a previous version of an instance that is being compared to a newer version of the instance (e.g., a version 1 of an instance being compared to a version 2 of an instance), or to a future version of an instance that is being compared to an older version of the instance (e.g., a version 2 of an instance being compared to a version 1 of the instance).

Implementations of this disclosure provide technological improvements particular to computer networks, for example, those concerning the identification of customization changes associated with instances. Computer network-specific technological problems, such as resolving an incident or an issue that is associated with customization changes, can be wholly or partially solved by implementations of this disclosure. For example, information including but not limited to the number of changes and the type of changes associated with a comparison between any of baseline scripts (also referred to as common scripts or original scripts), custom scripts, newly added or created scripts, and any combination thereof can be generated to determine whether and to what extent the customization changes have caused the incident experienced and to provide resolution options for the customer to utilize to resolve the incident in a more cost-effective, efficient, and streamlined manner. Implementations of this disclosure can thus introduce new and efficient improvements in the ways in which customization changes between instances (e.g., instances associated with a PaaS provider) are identified and associated incidents are resolved relating to computer-networks and cloud computing systems.

Figure 2:
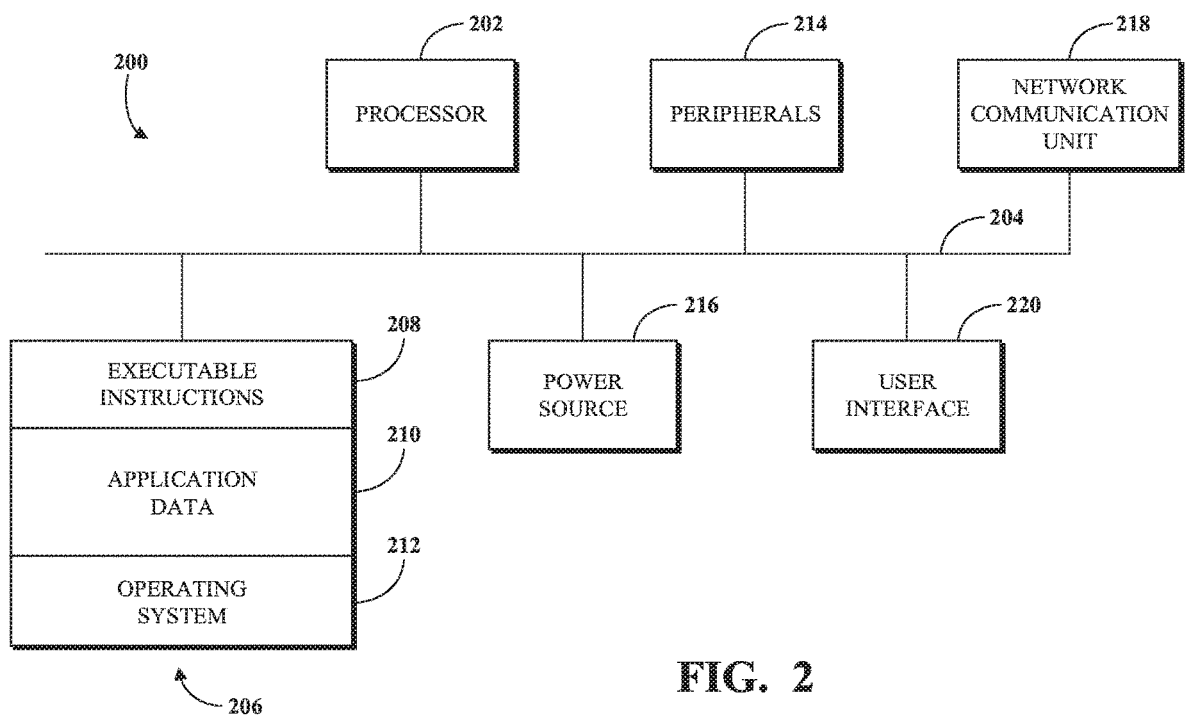
FIG. 2 is a block diagram illustrating an example of an internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing. The terms "database" and "database node" may be interchangeably used herein to refer to a data structure for storing data associated with software, such as application software executing on one or more application nodes.

To describe some implementations in greater detail, reference is first made to examples of hardware structures. FIG. 1 is a block diagram illustrating an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as the database 118 of the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as a database 118, which can be accessible by software executed on the application node 114. The database 118 may be implemented as a relational database management system (RDBMS), an object database, an XML database, a CMDB, a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MM.

One or more databases (e.g., the database 118), tables, other suitable information sources, or portions or combinations thereof may be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, an access table configured to allow or deny requests to access components of the system 100 can be implemented on the application server 112, the database server 116, or the load balancer 110. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram illustrating an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to generate records indicating that at least some of the application nodes within a distributed computing system (e.g., the system 100 shown in FIG. 1) are authorized to access at least some of the database nodes of the distributed computing system, store the records in an access table, receive a request to access a database node sent from an application node, determine whether the access table includes a record indicating that the application node is authorized to access the database node, and deny the request responsive to a determination that the access table does not include such a record.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

As aforementioned, a system for identifying resolutions associated with instance incidents is provided. Once an incident occurs, reproducing the actions and/or steps that were taken leading up to the incident can help provide data and information that can be utilized towards identifying resolutions for the incident.

Figure 3:
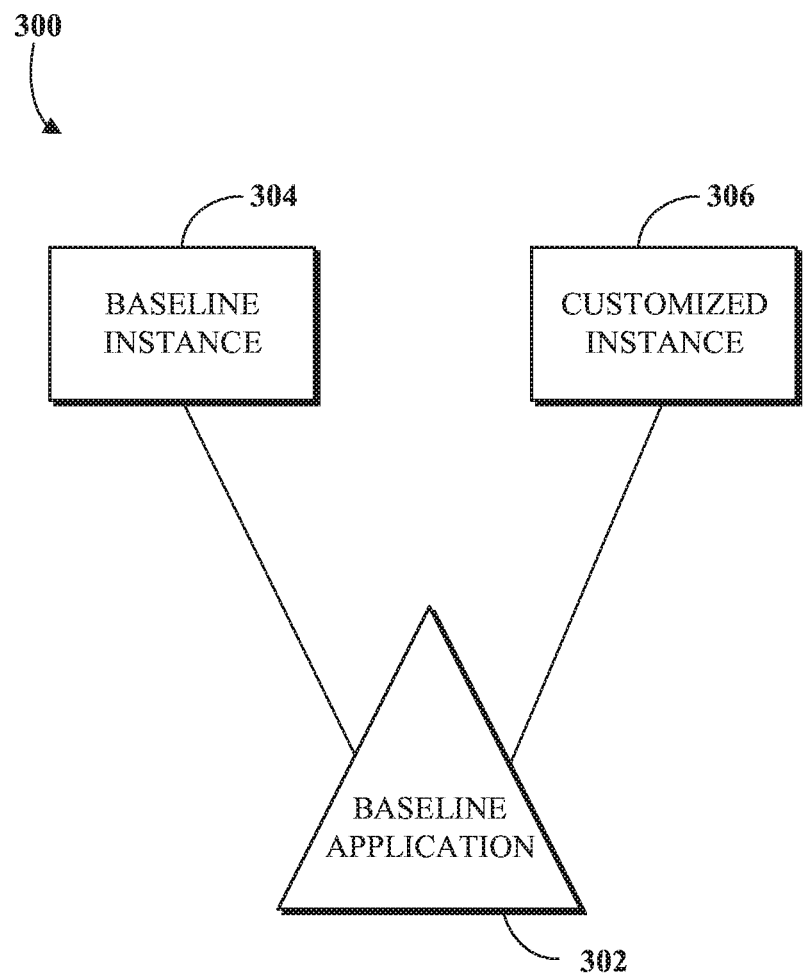
FIG. 3 is a block diagram illustrating an example of an environment for identifying customization changes between a baseline instance and a customized instance in accordance with implementations of this disclosure.

FIG. 3 is a block diagram illustrating an example of an environment 300 for identifying customization changes between a baseline instance and a customized instance in accordance with implementations of this disclosure. The environment 300 includes a baseline application 302, a baseline instance 304, and a customized instance 306. The baseline application 302 can be a system that is executed using computing devices, such as the systems, modules, and devices described with respect to FIGS. 1-2. The baseline application 302 can monitor and identify (i.e., detect) customization changes (e.g., different types of customizations including but not limited to code customizations, upgrade customizations, expected customizations, unknown customizations and different aspects of the instance being affected including but not limited to scripts, tables, ACLs, etc.) that have been applied to or that are associated with the customized instance 306 by comparing at least one of the scripts (or other aspects such as ACLs) of the customized instance 306 to at least one of the corresponding scripts (or other corresponding aspects) of the baseline instance 304. The baseline instance 304 can also be referred to as a first instance and the customized instance 306 can also be referred to as a second instance. The baseline instance 304 serves as the base instance that is being used in the comparison to another instance (e.g., the customized instance 306) to identify the presence of any potential customization changes between the two instances 304-306.

In some implementations, the baseline instance 304 is an original instance (e.g., an out of the box version of software and data) deployed to the customer by a service provider (e.g., a PaaS provider) and the customized instance 306 is a customized version of the baseline instance 304. The customized instance 306 can be customized by the customer (e.g., authorized users such as employers of the customer) or by third-party administrators that can manage the customized instance 306 on behalf of the customer. In some implementations, the baseline instance 304 is a customized instance (i.e., an original instance that has been customized to provide a first customized instance) and the customized instance 306 is a further customized instance (i.e., the original instance that has been customized is further customized to provide a second customized instance differentiated from the first customized instance).

The customization of the baseline instance 304 resulting in the customized instance 306 can be in the form of a software upgrade installation that updates the base instance (e.g., the baseline instance 304) from one version (i.e., an older version) to another version (i.e., a newer version) to provide the customized instance 306. Therefore, the baseline application 302 can compare two different versions of a customer's customized instance (e.g., the baseline instance 304 being a first customized instance with an older software version compared with the customized instance 306 being a second customized instance with a newer software version) to identify customization changes between the two instances. In other words, the baseline instance 304 is the instance that is being compared against or the instance that the user of the baseline application 302 wants to compare against as a baseline for comparison to another instance (e.g., the customized instance 306).

Figure 4:
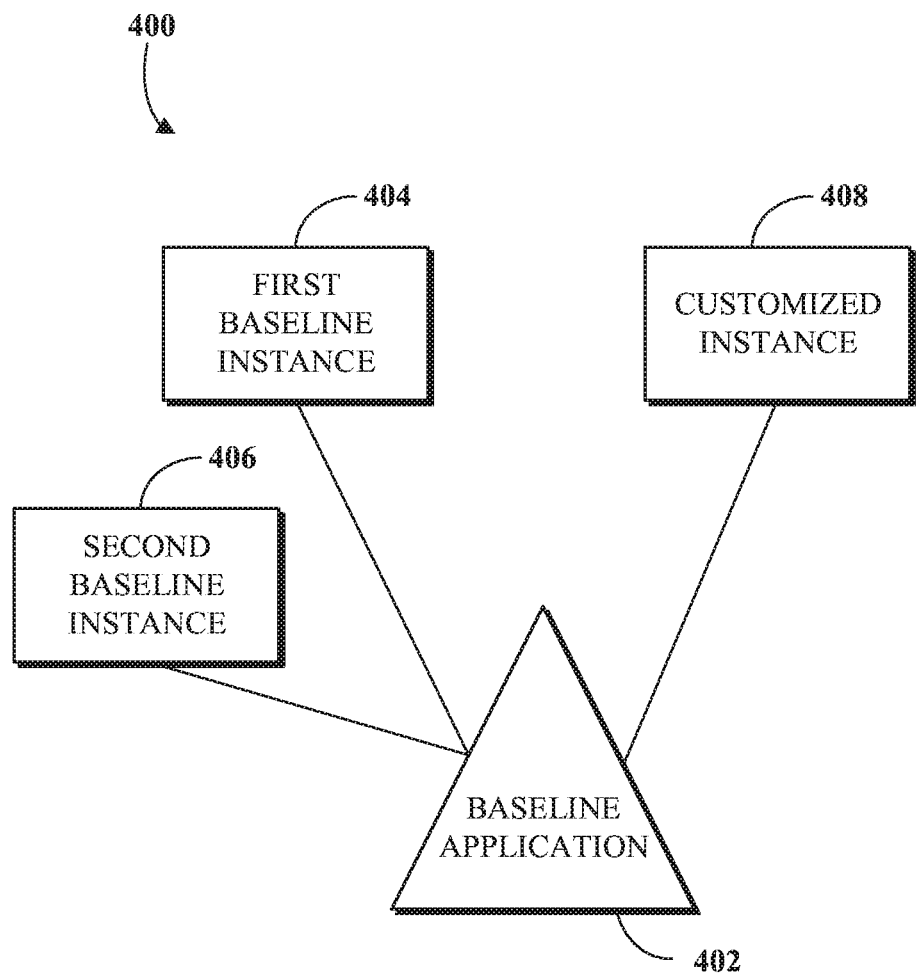
FIG. 4 is a block diagram illustrating an example of an environment for identifying customization changes between a plurality of instances in accordance with implementations of this disclosure.

FIG. 4 is a block diagram illustrating an example of an environment 400 for identifying customization changes between a plurality of instances in accordance with implementations of this disclosure. The environment 400 includes a baseline application 402, a first baseline instance 404, a second baseline instance 406, and a customized instance 408. The baseline application 402 can be a system that is executed using computing devices, such as the systems, modules, and devices described with respect to FIGS. 1-2. The baseline application 402 can monitor and identify (i.e., detect) customization changes (e.g., different types of customizations including but not limited to code customizations, upgrade customizations, expected customizations, unknown customizations and different aspects of the instance being affected including but not limited to scripts, tables, ACLs, etc.) that have been applied to or that are associated with the customized instance 408 by comparing at least one of the scripts (or other aspects such as ACLs) of the customized instance 408 to at least one of the corresponding scripts (or other corresponding aspects) of any of the first baseline instance 404 and the second baseline instance 406. The first and second baseline instances 404-406 serve as the base instances that are being used in the comparison to another instance (e.g., the customized instance 408) by the baseline application 402 to identify the presence of any potential customization changes between the three (or more) instances 404-408.

In some implementations, the environment 400 can include any number of baseline instances and any number of customized instances (i.e., a plurality of instances). The baseline application 402 can compare any two instances of the plurality of instances to determine the presence of any customization changes between them. The baseline application 402 can also compare any combination of two or more instances of the plurality of instances to determine the presence of any customization changes between any combination of the two or more instances being compared. For example, the baseline application 402 can compare a baseline instance (e.g., either the first or second baseline instance 404-406) to a customized instance (e.g., the customized instance 408), can compare a baseline instance to any combination of two or more customized instances, can compare any combination of two or more baseline instances to a customized instance, and can compare any combination of two or more baseline instances to any combination of two or more customized instances.

In some implementations, the first baseline instance 404 is an original instance (e.g., an out of the box version of software and data) deployed to the customer by a service provider (e.g., a PaaS provider), the second baseline instance 406 is either an older version or a newer version of the original instance, and the customized instance 408 is a customized version of either the first baseline instance 404 or the second baseline instance 406. The customized instance 408 can be customized by the customer (e.g., authorized users such as employers of the customer) or by third-party administrators that can manage the customized instance 408 on behalf of the customer. In some implementations, either the first baseline instance 404 and/or the second baseline instance 406 are customized instances (i.e., original instances that have been customized to provide first and second customized instances) and the customized instance 408 is a further customized instance (i.e., either of the original instances that have been customized are further customized to provide a third customized instance differentiated from either the first and the second customized instances).

The further customization of either the first and second baseline instances 404-406 resulting in the customized instance 408 can be in the form of a software upgrade installation that updates the base instance (i.e., either the first or second baseline instance 404-406) from one version (i.e., an older version) to another version (i.e., a newer version). Therefore, the baseline application 402 can compare two different versions of a customer's customized instance (e.g., either the first or second baseline instance 404-406 being a first customized instance with an older software version compared with the customized instance 408 being a second customized instance with a newer software version) to identify customization changes between the two instances. In other words, the first and second baseline instances 404-406 can be the instance that is being compared against or the instance that the user of the baseline application 402 wants to compare against as a baseline for comparison to another instance (e.g., the customized instance 408).

Figure 5:
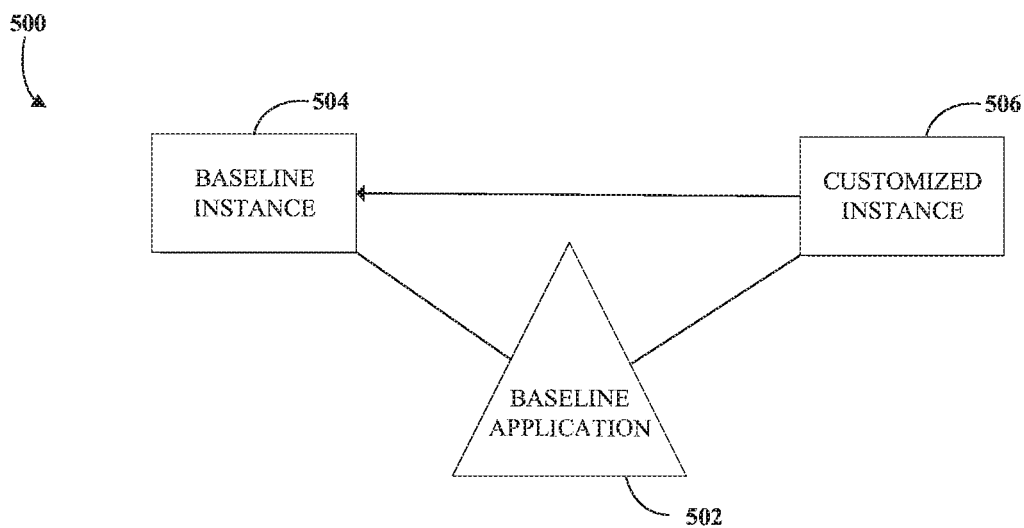
FIG. 5 is a block diagram illustrating an example of an environment for identifying past customization changes between in accordance with implementations of this disclosure.

FIG. 5 is a block diagram illustrating an example of an environment 500 for identifying past customization changes in accordance with implementations of this disclosure. The environment 500 includes a baseline application 502, a baseline instance 504, and a customized instance 506. The baseline application 502 can be a system that is executed using computing devices, such as the systems, modules, and devices described with respect to FIGS. 1-2. The baseline application 502 can monitor and identify (i.e., detect) customization changes (e.g., different types of customizations including but not limited to code customizations, upgrade customizations, expected customizations, unknown customizations and different aspects of the instance being affected including but not limited to scripts, tables, ACLs, etc.) by comparing at least one of the scripts (or other aspects such as ACLs) of the customized instance 506 to at least one of the corresponding scripts (or other corresponding aspects) of the baseline instance 504. The baseline instance 504 can also be referred to as a first instance and the customized instance 506 can also be referred to as a second instance. The baseline instance 504 serves as the base instance that is being used in the comparison to another instance (e.g., the customized instance 506) by the baseline application 502 to identify the presence of any past customization changes between the two instances.

Past customization changes can comprise customization changes that result from a customer making customization changes to the current instance that they are utilizing after they have already upgraded from a previous version of the instance or an older type of an instance. For example, a customer may want to determine what customization changes have occurred after experiencing an issue with their upgraded instance version or type that they did not experience when using their older instance version or type. Past customization changes can also comprise the customization changes that a customer must integrate with to ensure that their current instance properly functions. For example, a customer may need to make certain customization changes to their current instance based on customization changes that they made in the past to ensure the proper functioning of their current instance.

When the baseline application 502 determines the past customization changes, the customized instance 506 (i.e., current instance) can comprise a newer version of the instance or a newer type of instance and the customer can analyze customization changes between the current instance that they are utilizing and the previous instance(s) that they utilized. For example, a customer that has upgraded from a first version to a second version of the same instance type (e.g., upgraded from an older version of Geneva to a newer version of Geneva) can compare the second version that they are currently using to the first version that they used to use to determine any changes (i.e., past customization changes) between the two instances. In another example, a customer that has upgraded from a first type of instance to a second type of instance (e.g., upgraded from a Eureka instance to a Geneva instance) can compare the second type that they are currently using to the first type that they used to use to determine any changes (i.e., past customization changes) between the two instances. The baseline application 502 can compare the customized instance 506 to the baseline instance 504 (i.e., any of an older version or an older type of an instance in comparison to the customized instance 506) to determine a list of the past customization changes that a customer must address or integrate with. The baseline application 502 can provide recommended fixes or resolutions to the customer based on the past customization changes that are determined.

Figure 6:
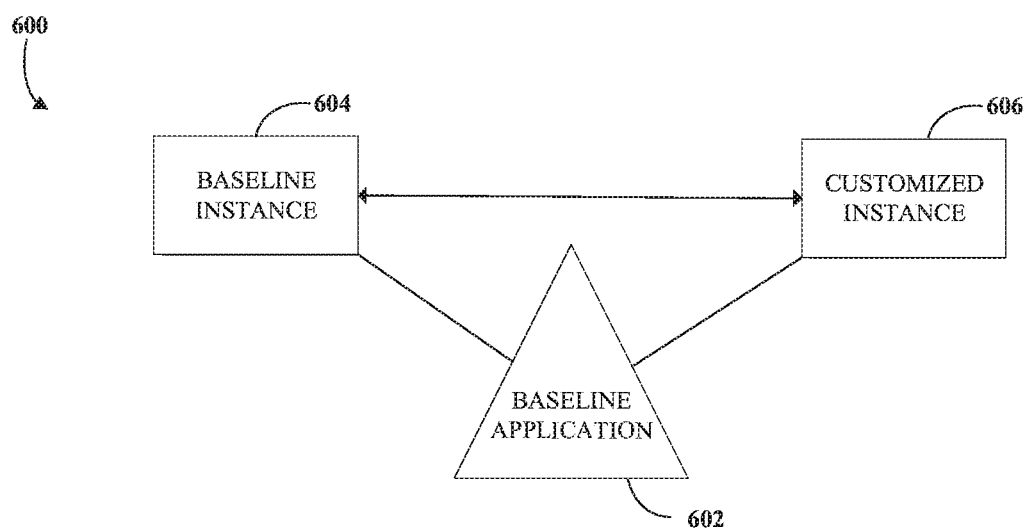
FIG. 6 is a block diagram illustrating an example of an environment for identifying current customization changes in accordance with implementations of this disclosure.

FIG. 6 is a block diagram illustrating an example of an environment 600 for identifying current customization changes in accordance with implementations of this disclosure. The environment 600 includes a baseline application 602, a baseline instance 604, and a customized instance 606. The baseline application 602 can be a system that is executed using computing devices, such as the systems, modules, and devices described with respect to FIGS. 1-2. The baseline application 602 can monitor and identify (i.e., detect) customization changes (e.g., different types of customizations including but not limited to code customizations, upgrade customizations, expected customizations, unknown customizations and different aspects of the instance being affected including but not limited to scripts, tables, ACLs, etc.) that have been applied to or that are associated with the customized instance 606 by comparing at least one of the scripts (or other aspects such as ACLs) of the customized instance 606 to at least one of the corresponding scripts (or other corresponding aspects) of the baseline instance 604. The baseline instance 604 can also be referred to as a first instance and the customized instance 606 can also be referred to as a second instance. The baseline instance 604 serves as the base instance that is being used in the comparison to another instance (e.g., the customized instance 606) by the baseline application 602 to identify the presence of any current customization changes between the two instances.

Current customization changes can comprise customization changes that result from a customer that makes customization changes to the current instance that they are utilizing (i.e., a customized instance) in comparison to an out of the box version of the instance they received from a service provider. A customer may want to determine what changes have occurred after experiencing an issue with their customized instance that they did not experience initially when using their out of the box version of the instance. For example, after a customer receives an out of the box version of an instance from a service provider, the out of the box version of the instance can be customized resulting in a customized version of the instance. The baseline application 602 can compare the out of the box version of the instance (i.e., the baseline instance 604) to the customized version of the instance (i.e., the customized instance 606) to determine any current or present customization changes that have occurred. The baseline application 602 can provide a list of the current customization changes that a customer has made with a direct location of the changes. The baseline application 602 can determine the list within a predetermined time period (e.g., within the past day, week, etc.). The baseline application 602 can provide recommended fixes or resolutions to the customer based on the current customization changes that are determined.

Figure 7:
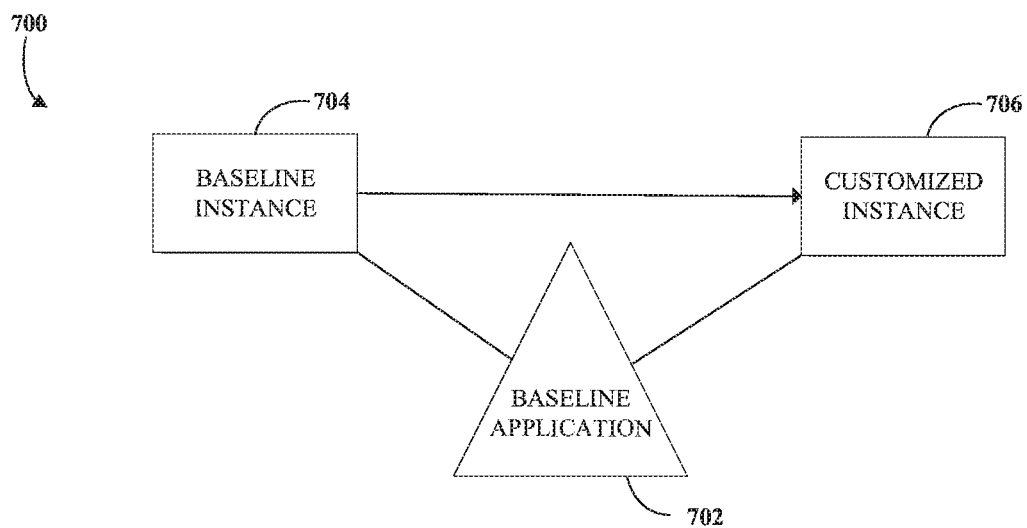
FIG. 7 is a block diagram illustrating an example of an environment for identifying future customization changes in accordance with implementations of this disclosure.

FIG. 7 is a block diagram illustrating an example of an environment 700 for identifying future customization changes in accordance with implementations of this disclosure. The environment 700 includes a baseline application 702, a baseline instance 704, and a customized instance 706. The baseline application 702 can be a system that is executed using computing devices, such as the systems, modules, and devices described with respect to FIGS. 1-2. The baseline application 702 can identify (i.e., detect) customization changes (e.g., different types of customizations including but not limited to code customizations, upgrade customizations, expected customizations, unknown customizations and different aspects of the instance being affected including but not limited to scripts, tables, ACLs, etc.) that will need to be applied to or that will need to be associated with the customized instance 706 by comparing at least one of the scripts (or other aspects such as ACLs) of the customized instance 706 to at least one of the corresponding scripts (or other corresponding aspects) of the baseline instance 704. The baseline instance 704 can also be referred to as a first instance and the customized instance 706 can also be referred to as a second instance. The baseline instance 704 serves as the base instance that is being used in the comparison to another instance (e.g., the customized instance 706) by the baseline application 702 to identify the presence of any future customization changes that will be needed between the two instances to ensure proper functioning.

Future customization changes can comprise customization changes that will need to be implemented by a customer when upgrading from an older version or type of an instance to a newer version or type of the instance. A customer may want to determine what changes will need to be implemented before upgrading to ensure a smooth transition during the upgrading process. For example, a customer that is upgrading from an older type of instance to a newer type of instance (e.g., upgrading from Fuji to Geneva) may want to determine what customization changes will be necessary to integrate with the newer type of instance. The baseline application 702 can compare the current version or type of instance that the customer is utilizing (i.e., the baseline instance 704) to the upgraded version or type of instance that the customer will be utilizing or that the customer is analyzing for future usage (i.e., the customized instance 706) to determine any future customization changes that will be needed. After determining the future customization changes needed, the customer can determine that the upgrade process will be too costly and/or time consuming because of the future customization changes that will be necessary and can avoid upgrading and incurring those costs.

Figure 8:
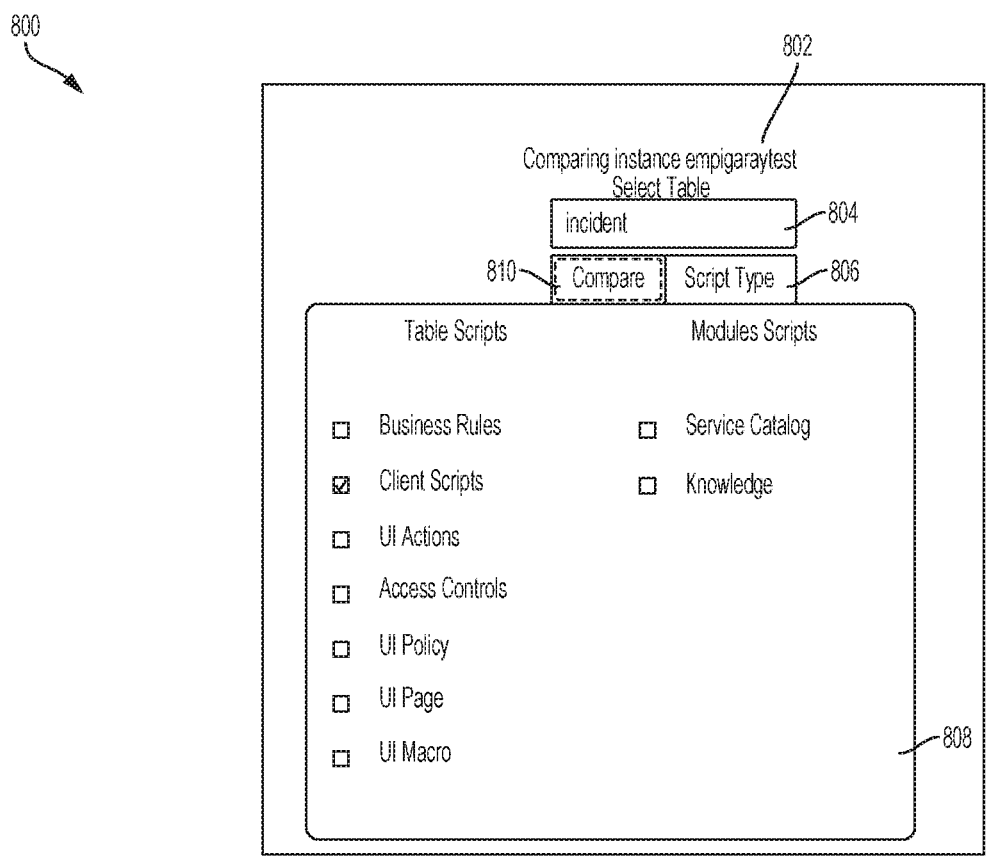
FIG. 8 is a screen shot illustrating an example of a system for identifying customization changes in accordance with implementations of this disclosure.

The baseline application 702 can provide a list of the future customization changes that a customer will need to make with a direct location of the required changes to ensure a smooth upgrade process. The baseline application 702 can also provide a list of recommended changes to the current instance (i.e., the baseline instance 704) to decrease the number of future customization changes required. By analyzing the future customization changes, the baseline application 702 can provide customers with a check list of future work that will need to be done either before the upgrade is done or when the upgrade is done or both, can create a plan to handle what changes will need to be done, and can list out aspects that will not require any changes. Therefore, the baseline application 702 can help a customer preemptively prepare for upgrades FIG. 8 is a screen shot illustrating an example of a system 800 for identifying customization changes in accordance with implementations of this disclosure. The system 800 can compare customization changes between two instances (i.e., a baseline instance and a customized instance) or a plurality of instances. The system 800 can be a system that is executed using computing devices, such as the systems, modules, and devices described with respect to FIGS. 1-2 and can be a baseline application such as the baseline applications 502, 602, and 702 described with respect to FIGS. 5-7. The system 800 includes an instance selection input field 802, a table selection input field 804, a script selection input field 806, a list of script types 808, and a compare button 810. The system 800 can include a variety of other text and input fields (e.g., time ranges) to enable the user to customize the comparison. A user can manually input into the instance selection input field 802 or can select the instance from a list of options that is presented once the instance selection input field 802 is selected. The instance selection input field 802 can include the customer's current customized instance, the baseline instance being used for the comparison, or both (e.g., the user can enter in both the baseline instance serving as the base instance in the comparison and the customized instance).

In FIG. 8, the instance name used in the comparison is 'empigaraytest'. After the instance has been selected via the instance selection input field 802, a table type or name can be selected via the table selection input field 804. The table type or name can be manually inputted or can be selected from a list of options. In FIG. 8, the table used in the comparison is 'incident'. After the table has been selected via the table selection input field 804, the script selection input field 806 (e.g., a script type button) can be selected presenting the list of script types 808. The list of script types 808 can include table scripts, modules scripts, and a plurality of other types of scripts. The table scripts can comprise any of business rules, client scripts, UI actions, access controls, UI policies, UI pages, and UI macros. The modules scripts can comprise any of service catalogs and knowledge scripts. In FIG. 8, the script that is being compared includes the client scripts as shown by the selection. After the system 800 receives inputs regarding the instance(s), table(s), and script(s), the customized changes can be identified by selection of the compare button 810.

Figure 9:
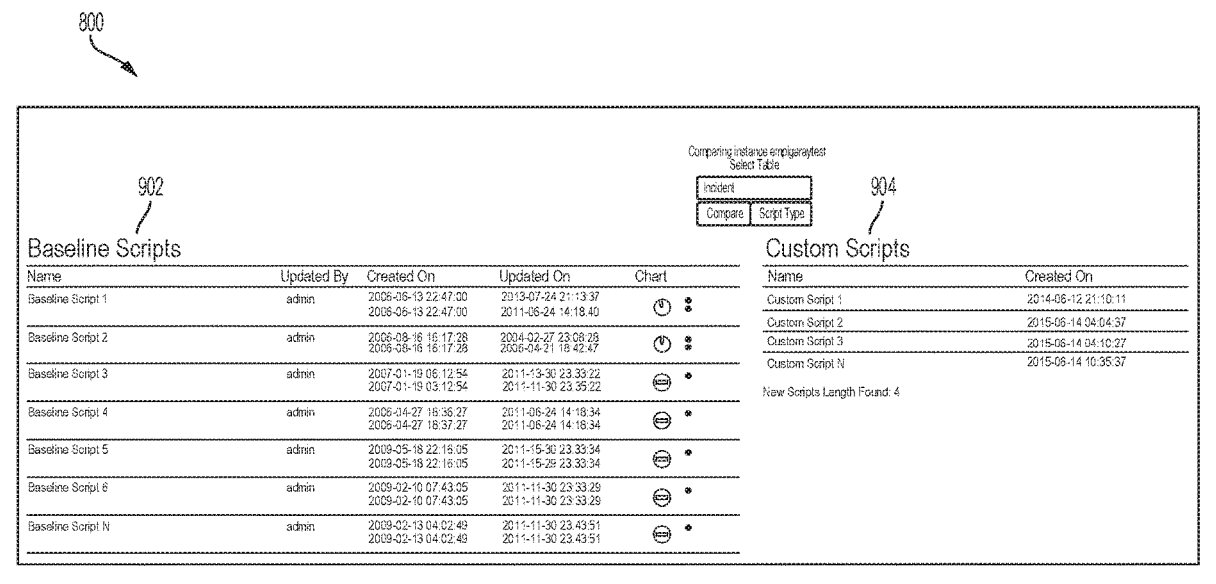

FIG. 9 is another screen shot illustrating an example of the system 800 for identifying customization changes in accordance with implementations of this disclosure. Referring to FIGS. 8 and 9 together, after selection of the compare button 810, the system 800 can provide a list of baseline scripts 902 of a baseline instance (e.g., a baseline instance that has been selected via the instance selection input field 802) and a list of custom scripts 904 of a customized instance (e.g., a customized instance that has been selected via the instance selection input field 802). The system 800 can include various types of information associated with each of the scripts (baseline scripts 902 or custom scripts 904) including but not limited to a name of the script, a creation date, an updated on date (if any), an updated by name (if any), and charting information.

The baseline scripts 902 can include baseline scripts associated with the user inputs (e.g., instance name/type via the instance selection input field 802, table name/type via the table selection input field 804, script name/type via the script selection input field 806). The baseline scripts 902 can only include the scripts that are in their original baseline form or can include all of the associated baseline scripts with information that identifies that they are either in their original baseline form or have been customized/updated. For example, in FIG. 9, the baseline scripts are listed with both a 'created on' and 'updated on' timestamps. The first two baseline scripts listed have different dates thereby identifying that the first two baseline scripts have been customized. A pie graph is provided indicating the amount of change between respective baseline and customized scripts. In addition, the custom scripts 804 can include the corresponding customizations to the baseline scripts or can include only newly added scripts that do not have a corresponding script in the baseline instance (i.e., scripts that were not present in the scripts of the baseline instance).

Figure 10:
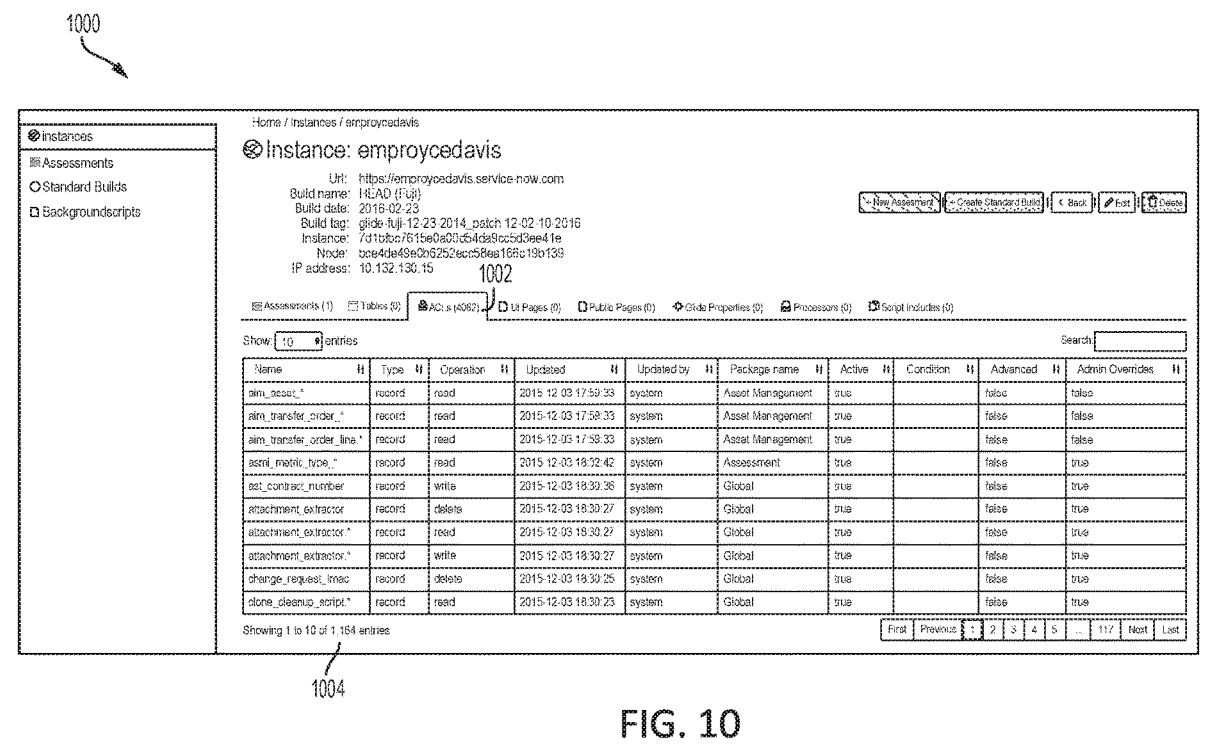

FIG. 10 is a screen shot illustrating a dashboard of an example of a system 1000 for auditing against security best practices in accordance with implementations of this disclosure. The system 1000 can be a system that is executed using computing devices, such as the systems, modules, and devices described with respect to FIGS. 1-2 and can be a baseline application such as the baseline applications 502, 602, and 702 described with respect to FIGS. 5-7. The system 1000 can be used to audit against security best practices. For example, the system 1000 can compare a customized instance versus another baseline instance that incorporates security best practices to identify where the customized instance fails to address or incorporate the security best practices or to identify where the customizations of the customized instance create vulnerabilities. The system 1000 can provide instructions to the user regarding the purpose of the security best practices and how to integrate them into the customized instance or how to update the customized instance to address the vulnerabilities.

A user can select the instances to be compared by the system 1000 and the aspects of the instances to be compared. For example, the user can specify any of assessments, tables, ACLs, UI pages, public pages, glide properties, and processors for the comparison. The system 1000 can provide a comparison between the access control lists (ACLs) that can be part of recommended security best practices. An ACL tab 1002 can display a total number of ACLs from a standard build of the baseline instance. After the system 1000 conducts the comparison, it can display a list of the customized ACLs in a results field 1004. In FIG. 10, the baseline instance includes 4062 ACLs that may be part of security best practices but only 1164 data entries are displayed because only 1164 data entries are customized. The remaining 2898 ACLs are not displayed to enable the user to focus on the 1164 customized ACLs that may be presenting vulnerabilities to the security best practices.

Figure 11:
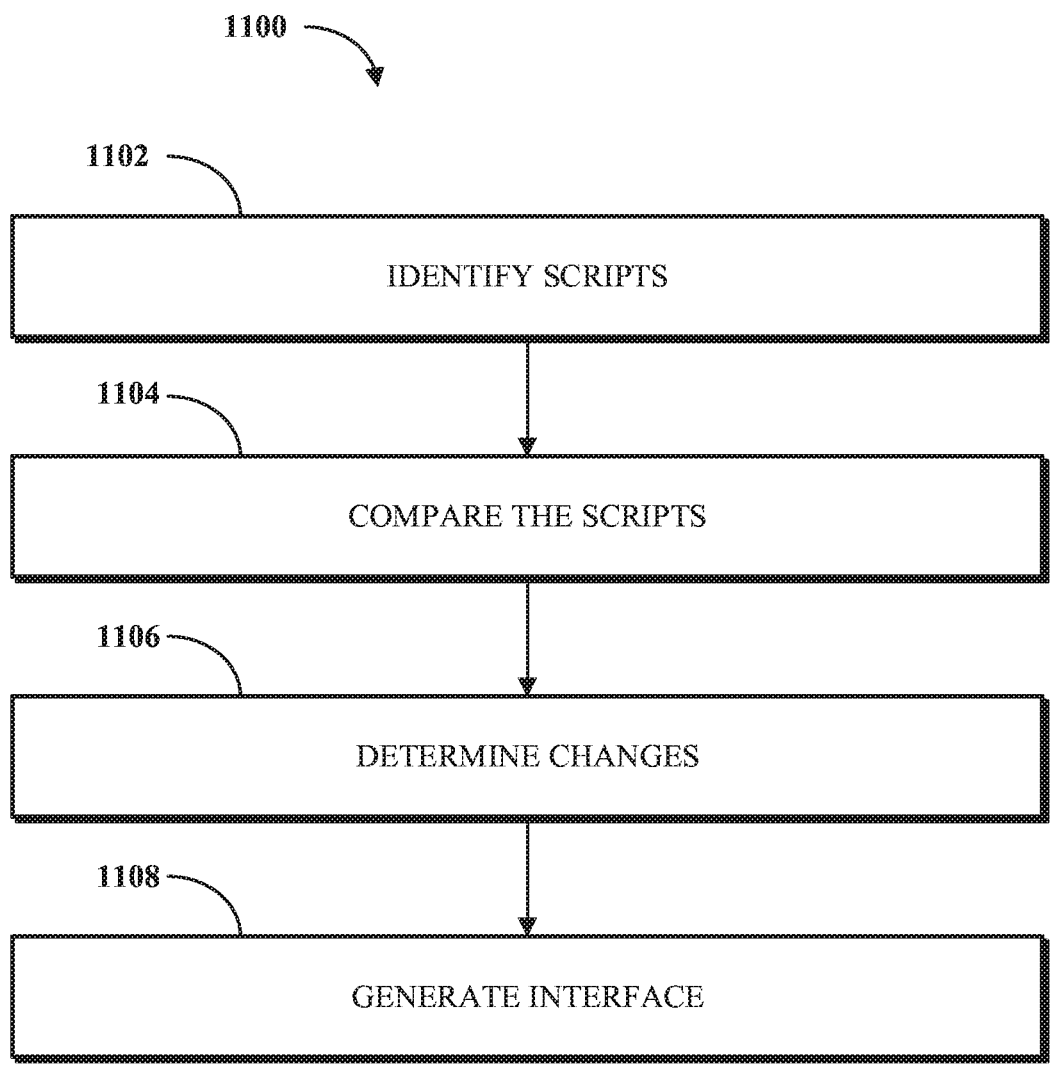
FIG. 11 is a flowchart illustrating an example of a technique for identifying customization changes in accordance with implementations of this disclosure.

FIG. 11 is a flowchart illustrating an example of a technique 1100 for identifying customization changes in accordance with implementations of this disclosure. The technique 1100 can be executed using computing devices, such as the systems, modules, and devices described with respect to FIGS. 1-3. The technique 1100 can be performed, for example, by executing a machine-readable program or other computer-executable instructions, such as instructions or programs described according to JavaScript, C, or other such instructions. The steps, or operations, of the technique 1100 or any other technique, method, process, or algorithm described in connection with the implementations disclosed herein can be implemented directly in hardware, firmware, software executed by hardware, circuitry, or a combination thereof.

The technique 1100 can identify customization changes between a variety of instances including but not limited to an instance of platform software in a single-tenant or multi-instance cloud computing infrastructure or platform. The technique 1100 includes identifying scripts, via 1102, comparing the scripts, via 1104, determining changes, via 1106, and generating an interface, via 1108.

In some implementations, the step of identifying scripts via 1102 can include identifying at least one baseline script from a baseline instance and identifying at least one custom script from a customized instance. The scripts can also be identifying between two customized instances. The step of comparing the scripts via 1104 can include comparing only two scripts (e.g., a baseline script to a comparable or associated custom script) or can include comparing a plurality of scripts at the same time (including but not limited to comparing all of the baseline scripts of the baseline instance to all of the custom scripts of the customized instance). The step of determining changes via 1106 can include determining various types of customization changes that resulted from providing or adding the custom scripts to the customized instance (which is a customized version of the baseline instance or the instance the customized instance is being compared to). The customization changes can comprise differences between the identified scripts associated with the instances being compared that include but are not limited to lines of code, overall size, and outputted results. The step of generating an interface via 1108 can include displaying the identified scripts and the determined changes on a graphical user interface that has been generated. The determined changes can also be transmitted to another device for storage or display on an existing interface.

Figure 12:
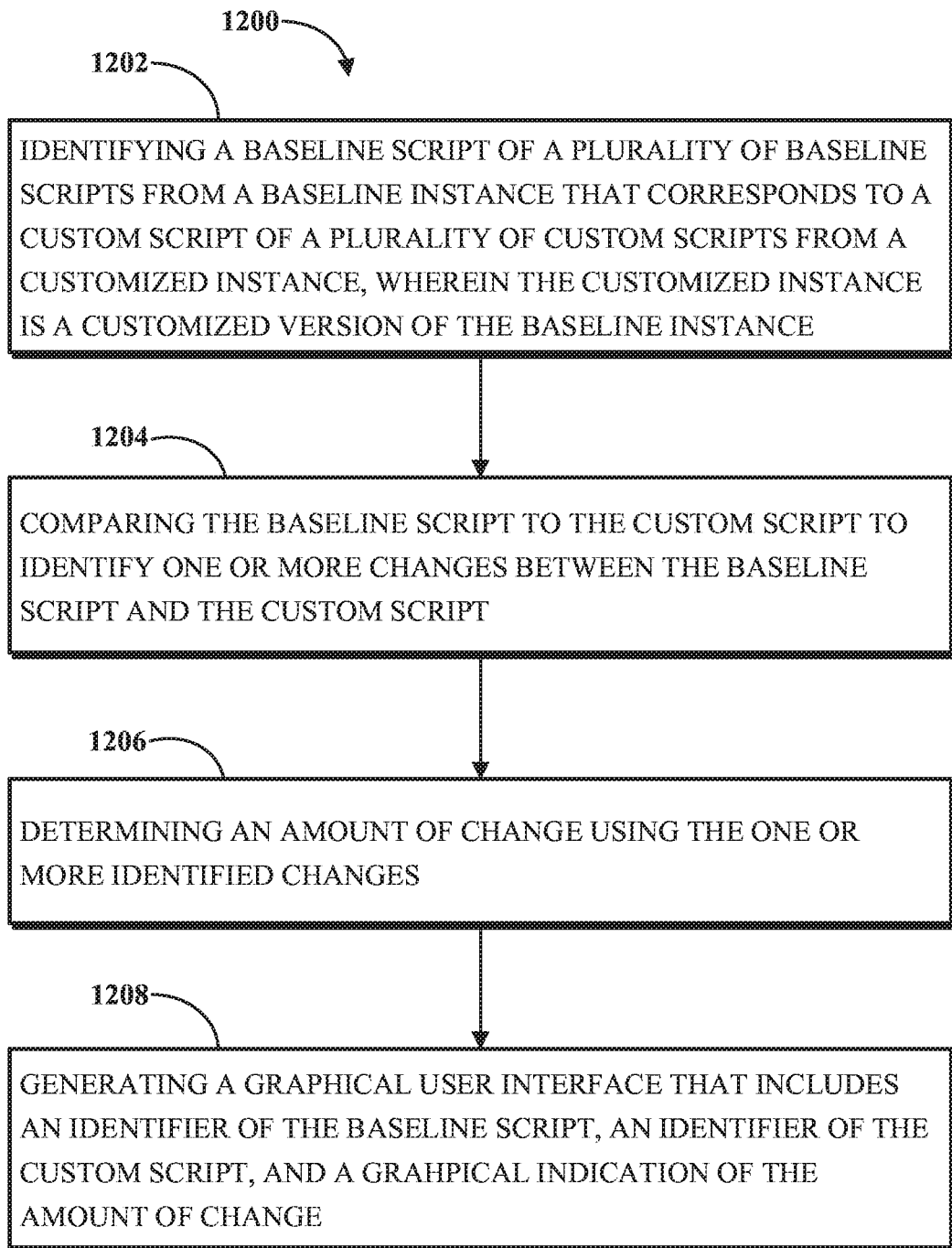
FIG. 12 is a flowchart illustrating an example of a technique for identifying customization changes in accordance with implementations of this disclosure.

FIG. 12 is a flowchart illustrating an example of a technique 1200 for identifying customization changes in accordance with implementations of this disclosure. The technique 1200 can be executed using computing devices, such as the systems, modules, and devices described with respect to FIGS. 1-3. The technique 1200 can be performed, for example, by executing a machine-readable program or other computer-executable instructions, such as instructions or programs described according to JavaScript, C, or other such instructions. The steps, or operations, of the technique 1200 or any other technique, method, process, or algorithm described in connection with the implementations disclosed herein can be implemented directly in hardware, firmware, software executed by hardware, circuitry, or a combination thereof.

The technique 1200 can identify customization changes between a variety of instances including but not limited to an instance of platform software in a single-tenant or multi-instance cloud computing infrastructure or platform. The technique 1200 includes identifying a baseline script of a plurality of baseline scripts from a baseline instance that corresponds to a custom script of a plurality of custom scripts from a customized instance, wherein the customized instance is a customized version of the baseline instance, via 1202. The technique 1200 includes comparing the baseline script to the custom script to identify one or more changes between the baseline script and the custom script, via 1204, and determining an amount of change using the one or more identified changes, via 1206. The technique 1200 includes generating a graphical user interface that includes an identifier of the baseline script, an identifier of the custom script, and a graphical indication of the amount of change, via 1208.

In some implementations, the technique 1200 compares scripts between two customized instances and the baseline instance can refer to the other customized instance that the customized instance is being compared to. The custom script can be any of a user interface script and a business rule script. The graphical indication of the amount of changes can comprise a percentage change. The one or more identified changes can include any of changed elements, additional elements, and missing elements. The technique 1200 can further include storing the one or more identified changes in a database, wherein the one or more stored changes are used for predictive analysis. The predictive analysis can utilize machine learning techniques and algorithms to determine whether an issue associated with the one or more stored changes corresponds to another issue associated with another customized instance. The technique 1200 can further include identifying a new script in the customized instance, wherein the new script does not correspond to the plurality of baseline scripts from the baseline instance. The amount of change can be used to audit the customized instance against at least one security best practice and to make recommendations if the at least one security best practice is not adhered to.

In some implementations, a system in accordance with the present disclosure includes means for identifying a baseline script of a plurality of baseline scripts from a baseline instance that corresponds to a custom script of a plurality of custom scripts from a customized instance, wherein the customized instance is a customized version of the baseline instance; means for comparing the baseline script to the custom script to identify one or more changes between the baseline script and the custom script; means for determining an amount of change using the one or more identified changes; and means for generating a graphical user interface that includes an identifier of the baseline script, an identifier of the custom script, and a graphical indication of the amount of change.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
one or more hardware processors of a server-side server; and
a non-transitory memory, the non-transitory memory storing computer-readable instruction that, when executed by the one or more hardware processors, causes the one or more hardware processors to perform operations comprising:
receiving data associated with an updated baseline instance of platform software, wherein the updated baseline instance is a version of a baseline instance that has had a software update installed and complies with a security policy;
receiving data associated with a customized instance of the platform software, wherein the customized instance is another version of the baseline instance having one or more user-customized features that are created by a client-side client device as added, removed, or modified script, wherein the data associated with the customized instance comprises an indication of a user customization to script of the updated baseline instance based on the one or more user-customized features;

determining that the customized instance does not comply with the security policy based on the data associated with the customized instance;

comparing the data associated with the updated baseline instance with the data associated with the customized instance to determine one or more modifications to the customized instance to bring the customized instance into compliance with the security policy; and generating instructions to be implemented by a user to apply the one or more modifications to the customized instance.

2. The system of claim 1, wherein comparing the data associated with the updated baseline instance with the data associated with the customized instance comprises:

matching a plurality of portions of the script of the customized instance to a plurality of respective corresponding portions of the script of the updated baseline instance; and flagging an unassociated portion of the script of the customized instance for which the updated baseline instance does not have a corresponding portion of the script.

3. The system of claim 2, wherein the instructions to be implemented by the user to apply the one or more modifications to the customized instance are applied to the unassociated portion of the script of the customized instance.

4. The system of claim 1, wherein the operations comprise:

receiving, via a graphical user interface (GUI), an input approving of the one or more modifications to the customized instance; and implementing the one or more modifications to update the customized instance in response to receiving the input.

5. The system of claim 1, wherein comparing the data associated with the updated baseline instance with the data associated with the customized instance comprises:

determining a percentage change between the script of the updated baseline instance and the script of the customized instance.

6. The system of claim 1, wherein the operations comprise:

storing the instructions and the one or more modifications, wherein the stored instructions and the stored one or more modifications are used to bring another customized instance into compliance with the security policy.

7. The system of claim 1, wherein the comparison occurs based on an audit schedule associated with the updated baseline instance, the customized instance, or both.

8. The system of claim 1, wherein determining the one or more modifications to the customized instance to bring the customized instance into compliance with the security policy comprises identifying that the one or more modifications were used to bring a previous instance into compliance with the security policy.

9. The system of claim 1, wherein the baseline instance comprises an out-of-the-box version of a customer instance.

10. A processor-implemented method, comprising:

receiving, via a processor device of a server-side server, data associated with an updated baseline instance of platform software, wherein the updated baseline instance is a version of a baseline instance that has had a software update installed and complies with a security policy;

receiving, via the processor device, data associated with a customized instance of the platform software, wherein the customized instance is another version of the baseline instance having one or more user-customized features that are created by a client-side client device as added, removed, or modified script, wherein the data associated with the customized instance comprises an indication of a user customization to script of the updated baseline instance based on the one or more user-customized features;

determining, via the processor device, that the customized instance does not comply with the security policy based on the data associated with the customized instance;

comparing, via the processor device, the data associated with the updated baseline instance with the data associated with the customized instance to determine one or more modifications to the customized instance to bring the customized instance into compliance with the security policy; and generating, via the processor device, instructions to be implemented by a user to apply the one or more modifications to the customized instance.

11. The processor-implemented method of claim 10, wherein comparing the data associated with the updated baseline instance with the data associated with the customized instance comprises:

matching, via the processing device, a plurality of portions of the script of the customized instance to a plurality of respective corresponding portions of the script of the updated baseline instance; and flagging, via the processing device, an unassociated portion of the script of the customized instance for which the updated baseline instance does not have a corresponding portion of the script.

12. The processor-implemented method of claim 11, wherein the instructions to be implemented by the user to apply the one or more modifications to the customized instance are applied to the unassociated portion of the script of the customized instance.

13. The processor-implemented method of claim 10, comprising:

storing, via the processing device and to a memory device, the instructions and the one or more modifications, wherein the stored instructions and the stored one or more modifications are used to bring another customized instance into compliance with the security policy.

14. The processor-implemented method of claim 10, wherein determining the one or more modifications to the customized instance to bring the customized instance into compliance with the security policy comprises identifying that the one or more modifications were used to bring a previous instance into compliance with the security policy.

15. A non-transitory computer-readable medium comprising computer readable code, that when executed by one or more processors of a server-side server, causes the one or more processors to perform operations comprising:

receiving data associated with an updated baseline instance of platform software, wherein the updated baseline instance is a version of a baseline instance that has had a software update installed and complies with a security policy;

receiving data associated with a customized instance of the platform software, wherein the customized instance is another version of the baseline instance having one or more user-customized features that are created by a client-side client device as added, removed, or modified script, wherein the data associated with the customized instance comprises an indication of a user customization to script of the updated baseline instance based on the one or more user-customized features;

determining that the customized instance does not comply with the security policy based on the data associated with the customized instance;

comparing the data associated with the updated baseline instance with the data associated with the customized instance to determine one or more modifications to the customized instance to bring the customized instance into compliance with the security policy; and generating instructions to be implemented by a user to the one or more modifications to the customized instance.

16. The non-transitory computer-readable medium of claim 15, wherein comparing the data associated with the updated baseline instance with the data associated with the customized instance comprises:

matching a plurality of portions of the script of the customized instance to a plurality of respective corresponding portions of the script of the updated baseline instance; and flagging an unassociated portion of the script of the customized instance for which the updated baseline instance does not have a corresponding portion of the script.

17. The non-transitory computer-readable medium of claim 16, wherein the instructions to be implemented by the user to apply the one or more modifications to the customized instance are applied to the unassociated portion of the script of the customized instance.

18. The non-transitory computer-readable medium of claim 15, wherein comparing the data associated with the updated baseline instance with the data associated with the customized instance comprises:

determining a percentage change between the script of the updated baseline instance and the script of the customized instance.

19. The non-transitory computer-readable medium of claim 15, wherein the operations comprise:

storing the instructions and the one or more modifications, wherein the stored instructions and the stored one or more modifications are used to bring another customized instance into compliance with the security policy.

20. The non-transitory computer-readable medium of claim 15, wherein determining the one or more modifications to the customized instance to bring the customized instance into compliance with the security policy comprises identifying that the one or more modifications were used to bring a previous instance into compliance with the security policy.

* * * * *